3,313,778
SULFONIC ACID ESTER MODIFIED POLYESTERS

Ryoichi Sakurai and Takeo Shima, Yamaguchi-ken, Japan, assignors to Teikoku Jinzo Kenshi Kabushiki Kaisha, Osaka, Japan, a corporation of Japan
No Drawing. Filed Mar. 28, 1961, Ser. No. 98,786
Claims priority, application Japan, Mar. 31, 1960, 35/11,133
1 Claim. (Cl. 260—49)

This invention relates to modified polyesters and the method of preparing the same. More particularly, the invention relates to polyesters in which organo sulfonic acid esters are linked in the main chain, and the method of preparing these polyesters.

Heretofore, the preparation of polyesters from dibasic acids and glycols is well known. Polyesters which consist of one or more of an aliphatic dicarboxylic acid, for example, succinic acid, adipic acid, sebacic acid, etc.; and aromatic dicarboxylic acids such as, for example, terephthalic acid, isophthalic acid, diphenyl dicarboxylic acid, naphthalene dicarboxylic acid, diphenylether dicarboxylic acid, diphenylsulfone dicarboxylic acid, diphenylmethane dicarboxylic acid, diphenoxyethane dicarboxylic acid, etc.; and one or more polymethylene glycols such as, for example, ethylene glycol and trimethylene glycol; alkylene glycols such as, for example, propylene glycol and butylene glycol; alicyclic glycols such as, for example, cyclohexane diol and 1,4-dihydroxymethyl cyclohexane are known. Among these, the polyesters that are obtained by the reaction of the dibasic acids such as, for example, terephthalic acid, isophthalic acid, etc. with the glycols such as, for example, ethylene glycol or 1,4-dihydroxy methyl cyclohexane are well known as possessing great value industrially as fibers or films.

The polycarbonates that are obtained by the reaction of aliphatic glycols, such as, for example, ethylene glycol, propylene glycol and trimethylene glycol, or phenols such as, for example, hydroquinone, bisphenol A, etc. with carbonic acid derivatives such as, for example, phosgene or diphenylcarbonate are also known as a type of polyester.

The fibers and films obtained from these polyesters possess, for example, high degrees of crystallinity and high softening points as well as excellent properties as regards their chemical resistance, heat stability, photo stability, strength, Young's modulus, etc.

On the other hand, the polyesters possess faults that offset the aforementioned advantages such as their poor dyeability and the fact that they pill easily. Hence, notwithstanding their excellent properties, as set forth above, a limitation as to their wide use exists because of these faults.

Accordingly, it is an object of the present invention to provide polyesters which have been improved as to their dyeability and a method of preparing such polyesters.

Another object of the invention is to provide polyesters possessing tenacity and elongation to an extent as to be fit for normal clothing and industrial uses, and moreover having very high affinity for dispersed dyes, and also a method of preparing such polyesters.

A still another object of the invention is to provide polyesters that have antipilling properties and a method of preparing such polyesters.

Other objects and advantages of the invention will be apparent from a consideration of the following description.

The objects and advantages of the present invention, as described hereinabove, are achieved by a modified polyester which has linked to the main chain thereof a minor proportion of at least one organo sulfonic acid ester having the following formula:

$$(X-Z)_n-Y \qquad (I)$$

wherein X and Y represent organic radicals, at least one of either X or Y possessing at least one ester-forming functional group and moreover the total number of the functional groups of X and Y being less than 3, and it being permissible that X and Y are identical or different; Z represents the following radical:

$$-SO_2-O-$$

$n$ is 1, 2, 3 or 4, and when $n$ is 2 or more, X may be the same organic radical or a different organic radical.

Moreover, in the aforementioned Formula I, either X or Y or both must have an ester-forming functional group such as, for example, a hydroxy group, a carboxyl group or a carboxyl group esterified by either an alkyl group or an aryl group, and the total number of said ester-forming functional groups of X and Y must be 1 or 2, because when the functional groups become 3 or more they act as a cross-linking agent, and polyesters suitable for use as fibers or films cannot be obtained. And when the number of said functional radicals possessed by X and Y is one, the modifier having the formula I, above, links to the terminus of the main chain of the polyester. On the other hand, when it is 2, said modifier is introduced to the mid chain and the terminus of the polyester.

If an example of a method of preparing the compounds of the aforesaid Formula I is given, it is readily prepared as follows: that is, by reacting in the presence of an alkali a sulfonyl halogenide as applicable depending upon the desired organic radicals X and Y with its corresponding alcohols or phenols, following which the obtained reaction mixture being poured into, for example, water, a compound of the aforementioned Formula I is separated.

As typical examples of the compounds of the aforementioned Formula I (Formulae Ia and Ib) that are used as modifiers in the present invention, the following, for example, may be mentioned:

(a) In case $n=1$ in Formula I:

β-Hydroxyethyl p-toluenesulfonate
β-Carbomethoxyethyl methanesulfonate
β-Carbomethoxyethyl dodecanesulfonate
β-Carbomethoxyethyl m-toluenesulfonate
p-Carbomethoxyphenyl ethanesulfonate
p-Carboethoxyphenyl p-toluenesulfonate
p-(β-Carboxyethyl)-phenyl chlorobenzenesulfonate
p-Carbomethoxybenzyl benzenesulfonate
p-Carboethoxydiphenylyl benzenesulfonate
3,5-dicarbomethoxyphenyl ethanesulfonate
3,5-dicarbomethoxyphenyl benzenesulfonate
3,5-dicarbomethoxyphenyl p-toluenesulfonate
2,5-dicarbomethoxyphenyl p-toluenesulfonate
2-β-hydroxyethoxy-5-carbomethoxyphenyl benzenesulfonate
3,5-dicarbomethoxyphenyl p-chlorobenzenesulfonate
3,5-diacetoxyphenyl benzenesulfonate (b) Those belonging to Formula I when $n=2$:

5-carbophenoxy-1,3-phenylene di-methanesulfonate
3,5-(di-carbo-β-hydroxyethoxy) phenyl-3,5'-phenylene di-toluenesulfonate
5-carbomethoxy-1,3-phenylene dibenzenesulfonate
di-p-toluenesulfonic acid ester of pentaerythritol (c) Those belonging to Formula I when $n=3$:

Tri-toluenesulfonic acid ester of pentaerythritol (d) Those belonging to Formula I when $n=4$:

Tetra-methanesulfonic acid ester of β,β-bis-(3,4-dioxyphenyl)-glutaric acid

In general the preparation of the polyesters of organic acids is divided into two steps, of which the first is the step in which intermediates of relatively low molecular weight are prepared by reacting in the presence of a usually known catalyst a dibasic acid or a hydroxy acid or their functional derivatives with a glycol or its functional derivatives such as, for example, alkylene carbonate, etc., and a second step wherein these intermediates are reacted further under reduced pressure or in the presence of an inert gas whereupon the high polymers having the ability of forming fibers or films are prepared.

These reactions may be either carried out by the continuous process or the batch process.

The polyesters of organic acids are obtained as a homopolymer, a copolymer or a block copolymer in accordance with the above-described method.

On the other hand, as already described, the polycarbonates are obtained by reacting aliphatic glycols and phenols such as, for example, hydroquinone or bisphenol A either with phosgene in the presence of an alkali, or with carbonic acid derivatives such as diphenyl carbonate in the presence of a suitable ester-exchange catalyst, the reaction usually being carried out in a single step.

The aforesaid modifiers as employed in the present invention may be added to these polyester-forming reactions at any stage thereof. It is however preferred that the addition of the modifier be effected at that time in the polyester-forming reaction comparatively near the end thereof, leaving however still enough time to enable said modifier to participate in the reaction. The reason for doing so is because if the aforesaid modifier is caused to maintain contact for a long period of hours with a large quantity of glycols at high temperature, part of the glycol polymerizes as to result in polyglycols becoming mixed in the polyesters that are formed as to occasionally result in lowering the softening point of the obtained polyester considerably. Furthermore, even though the aforesaid modifier, as used in the present invention, is added in the last stages of the polyester-forming reaction, it being readily introduced into the main chain of the polyester, the dyeability with respect to dispersed dyes can be improved conspicuously.

Inasmuch as generally in the case the organic acid polyesters as well as in the case of the polycarbonates, the forming reaction is usually carried out at about 250° to 300° C., it is desired that the modifier to be used in present invention be those among the organo sulfonic acid esters having the aforementioned Formula I that are stable at the above reaction temperature conditions. In view of this fact, among the modifiers of the invention, the aromatic esters of sulfonic acid, i.e., those in which X in Formula Ia is an aromatic group or those in which Y in Formula Ib is an aromatic group are particularly desirable.

In accordance with the invention, the aforesaid modifier may be added as to be contained in the modified polyester in a suitable amount within the range of 0.1 to 20 mol percent, preferably 0.5 to 5 mol percent, based on the acid component contained in the basic polyester to be modified.

When the modifier as used in the present invention, even though contained in the modified polyester, is contained in an amount less than 0.1 mol percent based on the acid component of the basic polyester that was modified, the intended improvement in dyeability is not achieved to an extent as to be satisfactory. On the other hand, when it exceeds 20 mol percent, even though the dyeability of the obtained modified polyester is not enhanced so much, there is manifested disadvantages on the physical properties such as the softening point of the modified polyester obtained. Therefore, it is preferable that the amounts to be added of the modifier be held within the above range.

Furthermore, in accordance with what is known in the art, additives of an auxiliary nature may be added, namely, delusterants such as, for example, titanium dioxide, stabilizers such as, for example, phosphorous acid, etc.

Next, examples of the invention will be given. It is to be understood however that these examples are presented merely for illustrative purposes and is not to be construed as limiting the invention in any manner whatsoever.

In the following examples, the parts and percentages unless otherwise indicated represent parts by weight and percentages by weight. And the intrinsic viscosity $[\eta]$ is a value determined using ortho-chlorophenol as the solvent at a temperature of 35° C.

EXAMPLE 1

*Synthesis of 3,5-dicarboxy phenyl p-toluenesulfonate*

One part of potassium 3,5-dicarboxy benzene sulfonate and 5 parts of potassium hydroxide were mixed and melted at 240° C. for 15 minutes with stirring. Then 20 parts of water were poured into the mixture, following which this was neutralized with hydrochloric acid. Upon cooling, crystals of 5-hydroxy-isophthalic acid were obtained quantitatively. When esterification was effected in accordance with accepted practices using methanol, dimethyl 5-hydroxyisophthalate (M.P. 159–160° C.) was obtained quantitatively.

212 parts of dimethyl 5-hydroxyisophthalate and 191 parts of p-toluenesulfonylchloride were dissolved in 600 parts of acetone, cooled to 0° C. following which 200 parts of 25% NaOH aqueous solution were poured therein. After completion of the pouring, the reaction product was poured into 5000 parts of water to be filtered off, and then after being washed thoroughly was recrystallized from methanol, 3,5-dicarbomethoxyphenyl p-toluenesulfonate (M.P. 131–132° C.) was obtained with a yield of 68%.

*Preparation of a modified polyester*

A reaction vessel connected with a distillation column was charged with 970 parts of dimethyl terephthalate, 690 parts of ethyleneglycol and 0.88 part of calcium acetate, which was then heated with stirring. After the methanol was distilled off, the product was transferred to an autoclave, then 36 parts of the 3,5-dicarbomethoxyphenyl p-toluenesulfonate obtained in accordance with the method described hereinabove, 0.3 part of antimony trioxide, 0.5 part of phosphorous acid and 5 parts of titanium dioxide, were added thereto and the mixture was thereafter heated to 275° C. As the reaction proceeded, the pressure was gradually reduced, and finally the reaction was carried out for 120 minutes at a reduced pressure of 0.2 mm. of mercury. The polymer obtained hand an $[\eta]$ of 0.55, a softening point of 256° C. and was a solid of excellent white color.

This polymer was melt spun at 290° C. with a spinning speed of 1000 m./min., drawn 3.8 times at 80° C. and heat set for 20 minutes at 140° C. The thus obtained staple fiber had a tenacity of 3.2 g./de. and an elongation of 50%. When dyed for 90 minutes at 96–97° C. in 4% (based on fabric weight) bath of Dispersol Scarlet B 150, it dyed a deep shade of scarlet. Moreover, a fabric woven of this staple fiber manifested hardly any occurrence of pilling at all.

For purpose of comparison, that which was prepared under identical conditions except that 3,5-dicarbomethoxyphenyl p-toluenesulfonate was not added had an $[\eta]$ of 0.70, a softening point of 262.1° C., and when that which was spun and drawn similarly was dyed, it had little affinity for this dye. Moreover, the occurrence of pilling in a fabric produced from this staple fiber was pronounced.

EXAMPLE 2

A reaction vessel connected with a distillation column was charged with 970 parts of dimethyl terephthalate, 690 parts of ethyleneglycol, 0.3 part of zinc acetate and 18 parts of 3,5-dicarbomethoxyphenyl benzenesulfonate, which was then heated with stirring. After the methanol was distilled off the product was transferred to an autoclave, then 0.3 part of antimony trioxide, 0.5 part of phosphorous acid and 5 parts of titanium dioxide were added thereto and the mixture was thereafter heated to 275° C.

As the reaction proceeded, the pressure was gradually reduced, and finally the reaction was carried out for 140 minutes at a reduced pressure of 0.2 mm. of mercury. The polymer obtained had an $[\eta]$ of 0.67, a softening point of 243° C. and was a solid of excellent white color. The staple fiber obtained as in Example 1 had a tenacity of 3.5 g./de. and an elongation of 51%. When dyed for 90 minutes at 96–97° C. in 4% (based on fabric weight) bath of Dispersol Scarlet B 150, it dyed a deep shade of scarlet, and a fabric produced from this staple fiber manifested hardly any occurrence of pilling at all.

EXAMPLES 3–11

970 parts of dimethyl terephthalate and 690 parts of ethylene glycol were mixed, and after effecting ester-interchange reactions, as in Example 1, employing the ester-interchange catalysts as listed in the second column of the following table, various types of modifiers as listed in the third column of said table and 0.4 part of antimony trioxide were added, following which the ethylene glycol was distilled off. Then the polymerization reaction was carried out for 90 minutes in vacuo at 0.1 mm. of mercury. The various properties of the thus obtained 9 types of polymers are presented in the fourth column et seq. of the following table as Examples Nos. 3–11. All of the determinations were in accordance with the methods of Example 1.

EXAMPLE 13

A reaction vessel was charged with 1550 parts of dimethyl terephthalate, 1450 parts of 1,4-dihydroxy methyl-cyclohexane and 0.8 part of titanic isopropoxide. The mixture was heated with stirring and the methanol formed was distilled off.

Then 70 parts of 2,5-dicarbomethoxyphenyl toluenesulfonate and 7 parts of titanium dioxide were added, and the mixture heated to 290° C., following which the pressure was gradually reduced and finally the reaction was continued for 120 minutes at a reduced pressure of 0.2 mm. of mercury.

When the resultant polymer which was spun and drawn as in Example 1 was similarly dyed as in the same example, a fiber of deep color was obtained.

EXAMPLE 14

A reaction vessel connected with a distillation column was charged with 28 parts of 2-β-hydroxyethoxy-5-carbo-methoxyphenyl benzenesulfonate as well as 980 parts of methyl p-β-hydroxyethoxybenzoate, 650 parts of ethylene glycol, 0.3 part of manganous acetate and 0.3 part of antimony trioxide. After distilling off the methanol formed, 0.6 part of triphenyl phosphite (stabilizer) was added to the reaction product, which was then heated to 270° C. and reacted for 150 minutes under a reduced pressure of 0.1 mm. of mercury whereby a polymer having an $[\eta]$ of 0.69 was obtained. When this polymer which was spun and drawn as in Example 1 was dyed similarly as in said example, it dyed a remarkably deep color.

EXAMPLE 15

30 parts of 3,5-dicarbomethoxyphenyl p-chlorobenzene-sulfonate as well as 970 parts of dimethyl terephthalate,

| Exp. No. | Ester-interchange | | Additive (part) | Softening point | $[\eta]$ | Dyeability |
|---|---|---|---|---|---|---|
| | Catalyst | Part | | | | |
| Control | Ca(OAc)₂ | 0.88 | None | 262.3 | 0.63 | Poor. |
| 3 | Ca(OAc)₂ | 0.88 | p-Carboethoxyphenyl, p-toluenesulfonate (16) | 257.0 | 0.48 | Good. |
| 4 | Ca(OAc)₂ | 0.88 | β-hydroxyethyl, p-toluenesulfonate (16) | 229.6 | 0.60 | Very good. |
| 7 | Ca(OAc)₂ | 0.88 | Di-p-carboethoxyphenyl, m-benzenedisulfonate (29) | 255.4 | 0.67 | Do. |
| 10 | LiOAc | 0.5 | Tri-toluenesulfonic acid ester of pentaerythritol (10) | 237.7 | 0.60 | Do. |
| 11 | Ca(OAc) | 0.88 | Tetra-methanesulfonic acid ester of β,β-bis-(3,4 dioxyphenyl)-glutaric acid (11) | 230.1 | 0.47 | Do. |

EXAMPLE 12

An autoclave connected with a distillation column was charged with 37 parts of 3,5-dicarbomethoxy phenyl p-toluenesulfonate as well as 1200 parts of terephthalic acid, 900 parts of ethylene glycol and 0.4 part of calcium acetate. Then, after substitution of the system with nitrogen gas, the mixture was heated with stirring under a gauge pressure of 2.3 kg./cm.² of the nitrogen. The pressure that increases with the rise in temperature was removed by means of a vent valve, and the pressure was maintained constantly at 2.3 kg./cm.² during the reaction. With the rise in the inside temperature, water formed was distilled off. After the inside pressure dropped with the stoppage of the distillation off of water, the reaction was continued for another 20 minutes. The reaction product was transferred to another autoclave, and then after adding 0.3 part of antimony trioxide and 0.3 part of phosphorous acid to the reaction product, it was heated to 270° C. As the reaction proceeded the pressure was gradually reduced until finally the pressure was reduced to 0.2 mm of mercury at which the reaction was carried on for 130 minutes. The resultant polymer was a white solid having an $[\eta]$ of 0.70, a softening point of 256.8° C. The fiber obtained by spinning and drawing as in Example 1, when dyed as in Example 1, dyed a deep color.

90 parts of dimethyl diphenyl-4,4'-dicarboxylate, 1260 parts of ethylene glycol and 0.1 part of zinc acetate were reacted as in Example 1 with the final stage being carried out for 170 minutes at 270° C. under a pressure of 0.2 mm. of mercury. The polymer obtained was made into film in accordance with accepted practices. When this was dyed as in Example 1 a film of remarkably deep color was obtained.

EXAMPLE 16

A reaction vessel connected with a distillation column was charged with 54 parts of 3,5-diacetoxyphenyl benzenesulfonate as well as 173 parts of adipic acid, 194 parts of p-phenylene diacetate and 0.1 part of zinc acetate. After having distilled off the acetic acid formed by heating with stirring, 0.4 part of germanium oxide was added, and the reaction mixture heated to 280° C., following which the pressure was reduced gradually and finally the reaction was continued for 80 minutes under a pressure of 0.5 mm. of mercury whereby a polymer having an $[\eta]$ of 0.37 was obtained.

Separately, a polymer having an $[\eta]$ of 0.48 was prepared from 150 parts of dimethyl terephthalate, 105 parts of ethylene glycol, 0.03 part of zinc acetate and 0.3 part of germanium oxide. To this were added 83 parts of the above copolymer, which was then reacted for 40 minutes at 270° C. under a pressure of 0.2 mm. of mercury whereby a white-colored polymer was obtained. When this was made into a film in accordance with accepted practices and dyed as in Example 1, it was observed that it dyed a remarkably deep color.

EXAMPLE 17

68 parts of sodium ethylate were dissolved in 900 parts of ethanol, and to this were then added 166 parts of ethyl p-oxybenzoate and dissolved. Separately, 191 parts of p-toluenesulfonylchloride were dissolved in 400 parts of ethanol at below 30° C., and this was then poured into the above-described solution, resulting in quantitatively obtaining 59 parts of sodium chloride. The reaction product was heated to the boiling point of ethanol, and then the sodium chloride formed was removed by filtration. Upon cooling the filtrate to 0° C., p-carboethoxyphenyl p-toluenesulfonate (M.P. 63–64° C.) was quantitatively obtained.

The ester-interchange reaction of 3360 parts of bis-(4-carbomethoxy)-phenylsulfone, 1800 parts of butylene glycol and 0.3 part of zinc acetate was effected as in Example 1, following which 170 parts of the p-carboethoxyphenyl p-toluenesulfonate obtained by the hereinabove-described method was employed as in Example 1 and the polymerization reaction was carried out. A film of the obtained polymer had high affinity to dispersed dyes.

EXAMPLE 18

53 parts of p-carbomethoxyphenylethane sulfonate were reacted, as in Example 1, together with 3360 parts of bis-(4-carbomethoxy)-phenylsulfone, 1800 parts of tetramethylene glycol and 0.3 part of zinc acetate. The film obtained from the polymer prepared as above dyed a deep color.

What we claim is:

A modified polyester, prepared from polyester-forming combination selected from the group consisting of (A) aliphatic dicarboxylic acids, aromatic dicarboxylic acids and the functional derivatives of said dicarboxylic acids with at least one glycol selected from the group consisting of aliphatic and cycloaliphatic glycols, (B) self-condensing oxycarboxylic acids selected from the group consisting of aliphatic and aromatic oxycarboxylic acids, (C) at least one compound selected from the group consisting of aliphatic glycols and divalent phenols with at least one carbonic acid derivative selected from the group consisting of phosgene and carbonic acid esters, which has linked to its main polymeric chain through a carboxyl ester group the residue of at least one organic sulfonic acid ester having the formula:

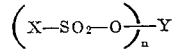

wherein $n$ is an integer from 1 to 4; X is an organic radical having no ester-forming functional group and being selected from the class consisting of alkyl groups each containing from 1 to 12 carbon atoms, phenyl group, toluyl groups and chlorophenyl groups; Y is an organic radical selected from the group consisting of lower alkyl groups, phenyl group, lower-alkyl phenyl groups and diphenyl group, each having from one to two ester-forming functional groups selected from the class consisting of hydroxy group, carboxyl group, alkoxy carbonyl group and phenoxy carbonyl group; the amount of said organic sulfonic acid ester being linked to said polyester chain being in the range of from about 0.1 to about 20 mol percent based on the amount of the acid component in said polyester.

References Cited by the Examiner

UNITED STATES PATENTS

| | | | |
|---|---|---|---|
| 2,999,846 | 9/1961 | Schnell | 260—49 |
| 3,004,006 | 10/1961 | King | 260—49 |
| 3,018,272 | 1/1962 | Griffing | 260—75 |
| 3,169,944 | 2/1965 | Scott et al. | 260—49 |
| 3,185,671 | 5/1965 | Horn | 260—75 |

FOREIGN PATENTS

| | | |
|---|---|---|
| 549,179 | 7/1956 | Belgium. |
| 745,412 | 2/1956 | Great Britain. |

WILLIAM H. SHORT, *Primary Examiner.*

P. E. MANGAN, M. GOLDSTEIN, J. C. MARTIN, L. P. QUAST, *Assistant Examiners.*